US012625544B2

(12) United States Patent
Boyle et al.

(10) Patent No.: US 12,625,544 B2
(45) Date of Patent: May 12, 2026

(54) EYE TRACKING SYSTEM FOR DETERMINING USER ACTIVITY

(71) Applicant: Sesame AI, Inc., San Francisco, CA (US)

(72) Inventors: Kevin Conlon Boyle, San Francisco, CA (US); Robert Konrad Konrad, San Francisco, CA (US); Nitish Padmanaban, Menlo Park, CA (US)

(73) Assignee: Sesame AI, Inc., San Francisco, CA (US)

( * ) Notice: Subject to any disclaimer, the term of this patent is extended or adjusted under 35 U.S.C. 154(b) by 577 days.

(21) Appl. No.: 17/980,343

(22) Filed: Nov. 3, 2022

(65) Prior Publication Data

US 2023/0142618 A1 May 11, 2023

Related U.S. Application Data

(60) Provisional application No. 63/276,106, filed on Nov. 5, 2021.

(51) Int. Cl.
*G06F 3/01* (2006.01)
*G02B 27/00* (2006.01)

(52) U.S. Cl.
CPC ......... *G06F 3/013* (2013.01); *G02B 27/0093* (2013.01)

(58) Field of Classification Search
CPC ............... G06F 3/013; G02B 27/0093; G02B 2027/0187; G02B 27/017; G02B 351/209
USPC ........................................... 351/209
See application file for complete search history.

(56) References Cited

U.S. PATENT DOCUMENTS

| | | | |
|---|---|---|---|
| 2015/0220157 A1 | 8/2015 | Marggraff et al. | |
| 2017/0083087 A1 | 3/2017 | Plummer et al. | |
| 2017/0372131 A1* | 12/2017 | Yang ....................... | G06F 3/013 |
| 2019/0171283 A1 | 6/2019 | Dey et al. | |

OTHER PUBLICATIONS

PCT International Search Report and Written Opinion, PCT Application No. PCT/US22/48851, Feb. 9, 2023, 9 pages.

* cited by examiner

*Primary Examiner* — Balram T Parbadia
*Assistant Examiner* — Rahman Abdur
(74) *Attorney, Agent, or Firm* — Fenwick & West LLP

(57) ABSTRACT

Embodiments relate to an eye tracking system. A headset of the system includes an eye tracking sensor that captures eye tracking data indicating positions and movements of a user's eye. A controller (e.g., in the headset) of the tracking system analyzes eye tracking data from the sensors to determine eye tracking feature values of the eye during a time period. The controller determines an activity of the user during the time period based on the eye tracking feature values. The controller updates an activity history of the user with the determined activity.

16 Claims, 9 Drawing Sheets

Headset
200

100

Headset
200

Frame
205

Eye Tracking
Sensor
215

Controller
260

Transceiver
265

Lens
210

Eye Tracking
Sensor
215

Lens
210

FIG. 2

Activity Clusters
Over Time

Case #1: Solid Focus

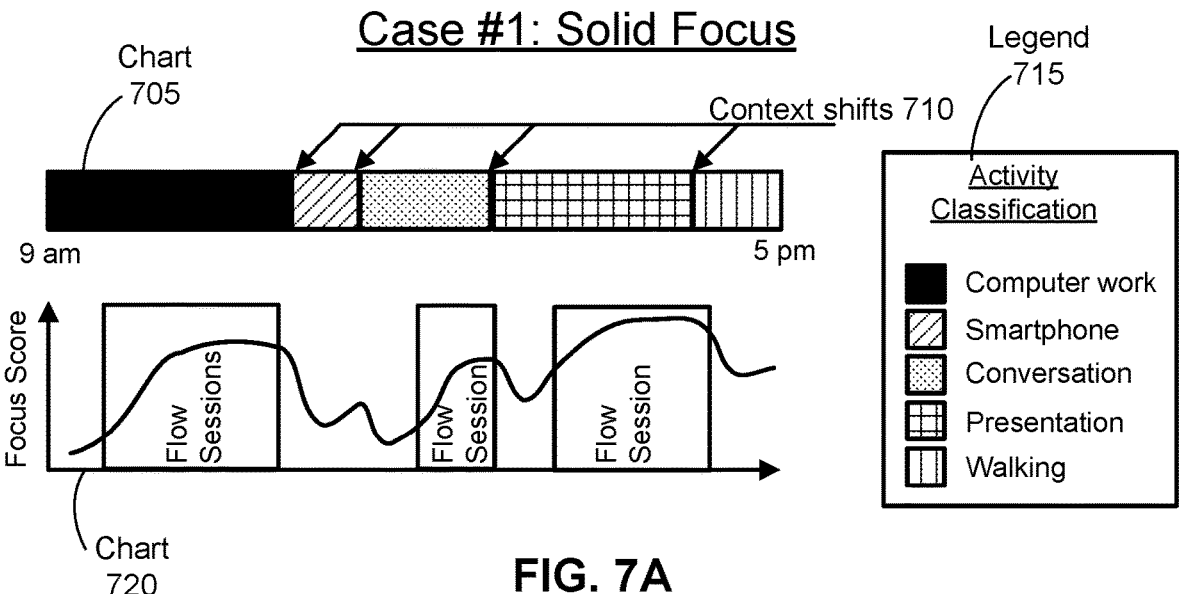

Chart 705

Context shifts 710

Legend 715

9 am        5 pm

Focus Score

Flow Sessions

Flow Session

Flow Session

Chart 720

Activity Classification

■ Computer work
▨ Smartphone
▦ Conversation
▦ Presentation
▥ Walking

FIG. 7A

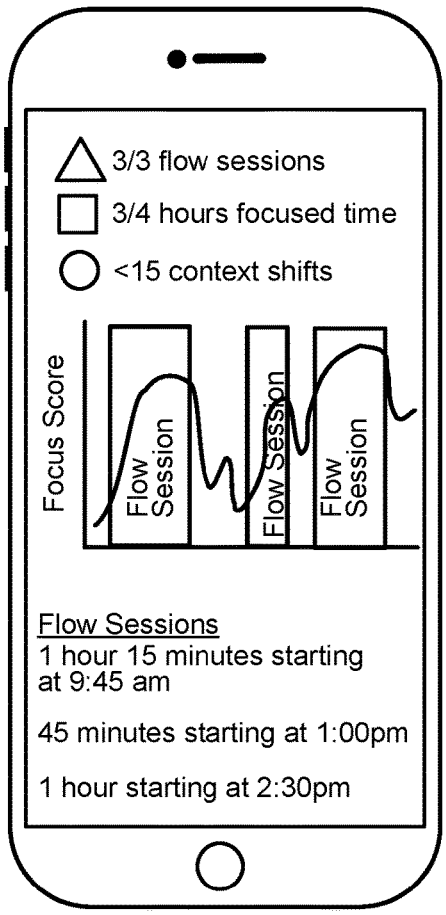

△ 3/3 flow sessions

□ 3/4 hours focused time

○ <15 context shifts

Focus Score

Flow Session

Flow Session

Flow Session

Flow Sessions
1 hour 15 minutes starting at 9:45 am 45 minutes starting at 1:00pm 1 hour starting at 2:30pm

Analyze eye tracking data to determine eye tracking feature values of an eye of a user of a headset during a time period
910

Determine a visual activity of the user during the time period based on the determined eye tracking feature values
920

Update an activity history of the user with the determined visual activity
930

EYE TRACKING SYSTEM FOR DETERMINING USER ACTIVITY

CROSS-REFERENCE TO RELATED APPLICATIONS

This application claims the benefit and priority of U.S. Provisional patent application Ser. No. 63/276,106, filed on Nov. 5, 2021, which is hereby incorporated by reference in its entirety.

FIELD OF THE INVENTION

This disclosure relates generally to an eye tracking system, and more specifically to an eye tracking system that determines a user's activity based on eye tracking data.

BACKGROUND

Current eye tracking systems include an outward facing camera and rely on projecting a user's gaze into an outward facing image of the world around the user. In these cases, the eye tracking system estimates the gaze vector of the user and projects it into an outward facing camera image to display where the user is looking in the world. From this, behavioral data about the user's activities and attention may be inferred.

SUMMARY

The human visual system can be a dominant part of human interaction with the world. As such, the behavior of the eyes can be linked to the activity the person is performing. Specifically, eye movements can reveal behavior associated with (e.g., visual) activities (e.g., looking at computer monitor vs reading a physical book). Due to this, an eye tracking system described herein can determine a user's activity by analyzing behavior of one or both of the user's eyes (e.g., without referencing an outward facing camera image).

Embodiments of the present disclosure relate to an eye tracking system. An eye tracking system includes an eye tracking sensor and a controller (e.g., both part of a headset configured to be worn by a user). The eye tracking sensor is configured to capture eye tracking data that indicates eye tracking features of a user's eye (e.g., positions and movements of the user's eye). The controller of the eye tracking system analyzes eye tracking data from the sensors to determine eye tracking feature values of the eye during a time period. The controller determines an (e.g., visual) activity of the user during the time period based on the eye tracking feature values. The controller updates an activity history of the user with the determined activity.

Other aspects include components, devices, systems, improvements, methods, processes, applications, computer readable mediums, and other technologies related to any of the above.

BRIEF DESCRIPTION OF THE DRAWINGS

FIG. 2 is a perspective view of a headset that can be integrated into the platform of FIG. 1, in accordance with one or more embodiments.

FIG. 7A illustrates a chart of a user's activities throughout a day and a chart of the user's focus score throughout the day, in accordance with one or more embodiments.

FIG. 7B illustrates a smartphone displaying activity insights corresponding to the data displayed in FIG. 7A, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure relate to eye tracking systems and methods for using eye tracking data, such as eye movement and gaze, to detect and classify (e.g., visual) activities a user performs over time (e.g., throughout a day). An eye tracking system may be configured to record eye tracking data all day across many contexts and activities. An eye tracking system includes an eye tracking sensor and a controller that processes data from the eye tracking sensor. An eye tracking system may be (e.g., in part) implemented in a headset and may be part of a networked environment. Example headsets in network environments are further described with respect to FIGS. 1 and 2. However, eye tracking systems are not required to be part of a headsets or networked environments. For example, an eye tracking system may be desk mounted or room mounted.

Figure 1:
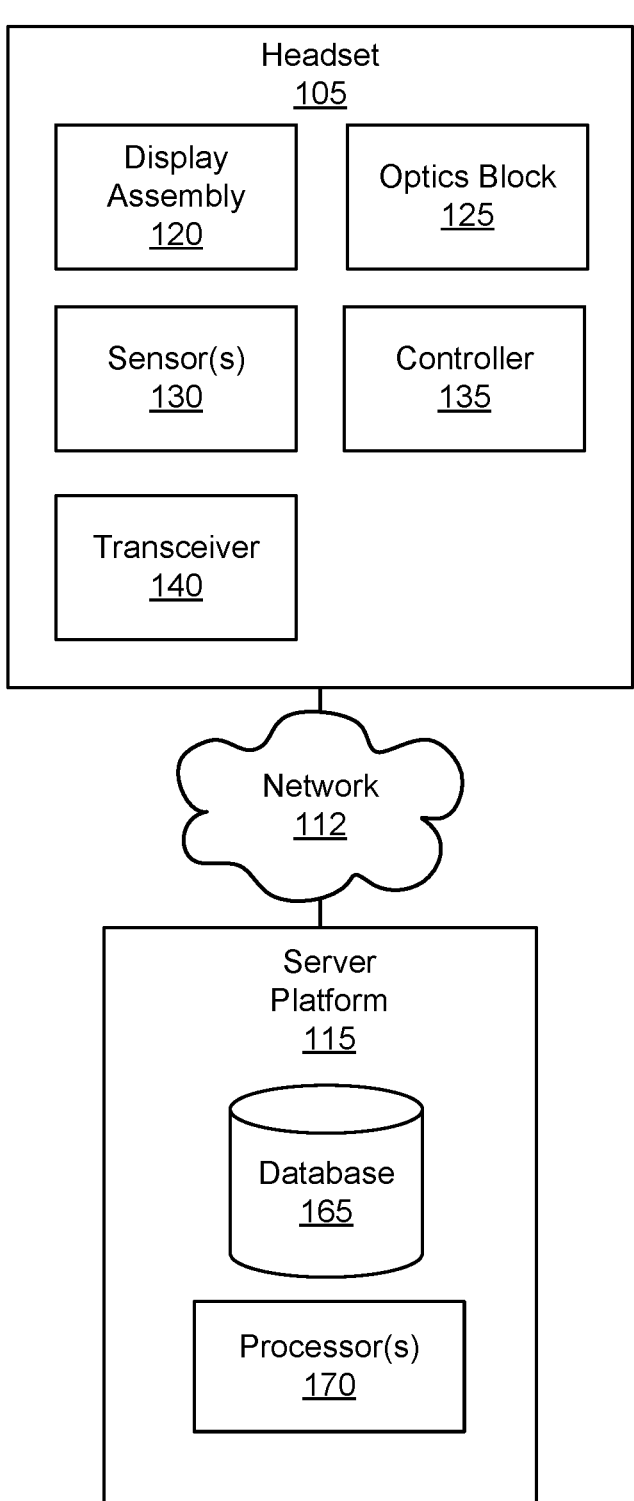
FIG. 1 is a block diagram of a platform that includes a headset, in accordance with one or more embodiments.

FIG. 1 is a block diagram of a platform 100 that includes a headset 105, in accordance with one or more embodiments. The platform 100 shown by FIG. 1 includes the headset 105 and a server platform 115 coupled together via a network 112. In alternative configurations, different or additional components may be included in the platform 100. Additionally, functionality described in conjunction with one or more of the components shown in FIG. 1 may be distributed among the components in a different manner than described.

The headset 105 is an example eye tracking system that includes a display assembly 120, an optics block 125, one or more sensors 130, a controller 135, and a transceiver 140. Some embodiments of the headset 105 have different components than those described in conjunction with FIG. 1.

The display assembly 120 displays content to a user wearing the headset. The display assembly 120 displays the content using one or more display elements (e.g., lenses). A display element may be, e.g., an electronic display. In various embodiments, the display assembly 120 comprises a single display element or multiple display elements (e.g., a display for each eye of the user). Examples of an electronic display include: a liquid crystal display (LCD), an organic light emitting diode (OLED) display, an active-matrix organic light-emitting diode display (AMOLED), a waveguide display, some other display, or some combination thereof. In some embodiments, a lens may also include some or all of the functionality of the optics block 125.

The optics block 125 may magnify image light received from the electronic display, corrects optical errors associated with the image light, and present the corrected image light to one or both eye boxes of the headset 105. In various embodiments, the optics block 125 includes one or more optical elements. Example optical elements included in the optics block 125 include: an aperture, a Fresnel lens, a convex lens, a concave lens, a filter, a reflecting surface, or any other suitable optical element that affects image light. Moreover, the optics block 125 may include combinations of different optical elements. In some embodiments, one or more of the optical elements in the optics block 125 may have one or more coatings, such as partially reflective or anti-reflective coatings.

Magnification and focusing of the image light by the optics block 125 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110° diagonal), and in some cases, all of the user's field of view. Additionally, in some embodiments, the amount of magnification may be adjusted by adding or removing optical elements.

In some embodiments, the optics block 125 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 125 corrects the distortion when it receives image light from the electronic display generated based on the content.

The one or more sensors 130 may capture data related to a user wearing the headset 105. The one or more sensors 130 include one or more eye tracking sensors. Eye tracking sensors capture eye tracking data. Example eye tracking sensors are further described with respect to FIG. 2.

The controller 135 may control operations of one or more components of the headset 105. The controller 135 may comprise a processor and a non-transitory computer-readable storage medium (e.g., memory). The controller 135 processes at least a portion of the data captured by the one or more sensors 130. Among other possible operations, the controller is configured to use eye tracking data from one or more eye tracking sensors to determine a user's activity. Depending on the processing power of the controller 135 and the computational tasks to be computed, the controller 135 may provide eye tracking data or processed versions of eye tracking data to the server platform 115 (via the transceiver 140) for processing to help determine a user's activity. Example controllers are further described with respect to FIGS. 2-3.

The transceiver 140 may communicate, via the network 112, data with the server platform 112. For example, the transceiver 140 communicates sensor data to the server platform 112 for further processing.

The network 112 couples the headset 105 to the server platform 115. The network 112 may include any combination of local area and/or wide area networks using both wireless and/or wired communication systems. For example, the network 112 may include the Internet, as well as mobile telephone networks. In one embodiment, the network 112 uses standard communications technologies and/or protocols. Hence, the network 112 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The server platform 115 includes a database 165 and one or more processors 170. Some embodiments of the server platform 115 have different components than those described in conjunction with FIG. 1. The database 165 may store user's data (e.g., a processed version of data as processed by the headset 105). The database 165 may be a non-transitory computer readable storage medium. The one or more processors 170 may perform computations to, e.g., extract various statistics, features (e.g., eye tracking features), activities (e.g., visual activities), or some combination thereof from the user's data (e.g., eye tracking data) obtained from the headset 105. Among other advantages, processors 170 may provide additional computational resources to the headset 105. For example, a large computational task may be sent from the headset 105 to the processors 170 to reduce the computational load on the headset 105. To provide a more specific example, the processors 170 may determine activities performed by a user throughout a day based on eye tracking feature values received from the headset 105.

The server platform 115 in FIG. 1 may be replaced with other types of computing devices, such as a client computer, a personal computer (PC), a tablet PC, a set-top box (STB), a smartphone, an internet of things (IoT) appliance, a network router, switch or bridge, or any other machine capable of executing instructions that specify actions to be taken by that machine.

One or more components of the platform 100 may contain a privacy module that stores one or more privacy settings for user data elements. The user data elements describe the user or the headset 105. For example, the user data elements may describe sensitive information data of the user, a physical characteristic of the user, an action performed by the user, a location of the user of the headset 105, a location of the headset 105, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The platform 100 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Figure 2:
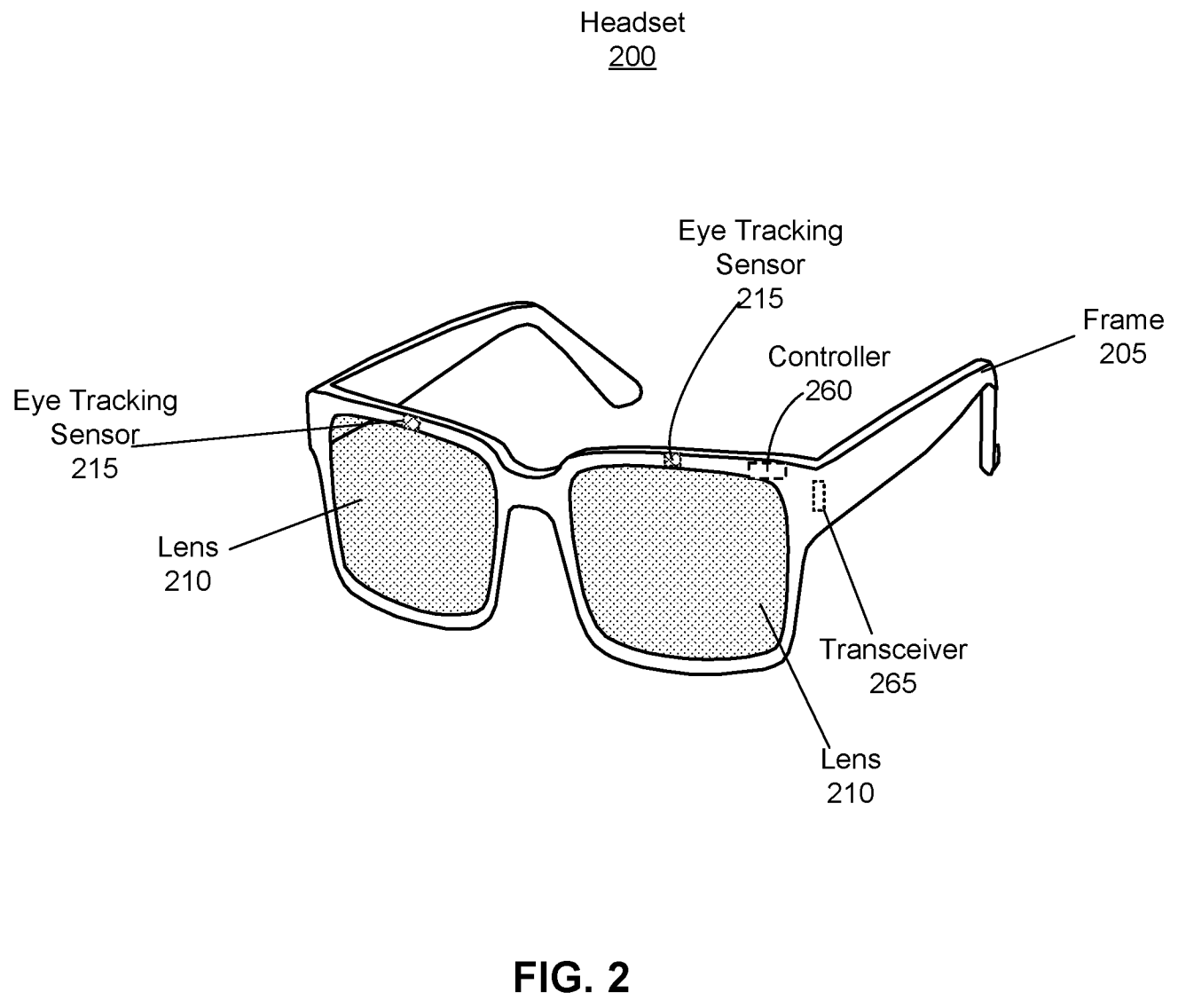

FIG. 2 is a perspective view of a headset 200, in accordance with one or more embodiments. The headset 200 is an example eye tracking system that can capture and analyze eye tracking data. The headset 200 may be an example embodiment of headset 105. The headset 200 may be worn on the face of a user and may be configured such that content (e.g., media content) is presented via one or more lenses 210 of the headset 200. Examples of content presented by the headset 200 include one or more images, video, audio, or some combination thereof. The headset may be a virtual reality (VR), augmented reality (AR), or mixed reality (MR) system.

The headset 200 may include, among other components, a frame 205, a pair of lenses 210, an eye tracking sensor 215 for each eye, a controller 260, a transceiver 265, and a power assembly (not shown in FIG. 2). While FIG. 2 illustrates the components of the headset 200 in example locations on the headset 200, the components may be located elsewhere on the headset (e.g., in the bottom or sides of the frame 205) 200, on a peripheral device paired with the headset 200, or some combination thereof. Similarly, there may be more or fewer components on the headset 200 than what is shown in FIG. 2.

Among other possible uses, the headset 200 may correct or enhance the vision of a user, protect the eye of a user, or provide images to a user. The headset 200 may produce artificial reality content for the user. The headset 200 may be smart electronic eyeglasses. The headset 200 may be eyeglasses which correct for defects in a user's eyesight. The headset 200 may be sunglasses which protect a user's eye from the sun. The headset 200 may be safety glasses which protect a user's eye from impact. The headset may be integrated into other types of headsets. For example, the headset 200 may be part of a night vision device or infrared goggles to enhance a user's vision at night. In another example, the headset 200 may be part of a mask or full-face respirator that filters a user's air. In another example, the headset 200 may be part of a welding shield or helmet to protect a user's eyes from intense light and the user's face from sparks. In another example, the headset 200 may be part of diving goggles that separate a user's eyes from surrounding water. Components of the headset 200, such as the frame 205 or lenses 210, may have different form factors than that illustrated in FIG. 2.

The frame 205 holds other components of the headset 200. The frame 205 includes a front part that holds the one or more lenses 210 and end pieces to attach to a head of the user. The front part of the frame 205 bridges the top of a nose of the user. The end pieces (e.g., temples) are portions of the frame 205 to which the temples of a user are attached. The length of the end piece may be adjustable (e.g., adjustable temple length) to fit different users. The end piece may also include a portion that curls behind the ear of the user (e.g., temple tip, ear piece).

The one or more lenses 210 provide light to a user wearing the headset 200. As illustrated, the headset 200 includes a lens 210 for each eye of the user. In some embodiments, each lens 210 is part of a display block (not shown) that generates image light that is provided to an eye box of the headset 200. The eye box is a location in space that an eye of the user occupies while the user wears the headset 200. In this context, the headset 200 may generate Virtual Reality (VR) content. In some embodiments, one or both of the lenses 210 are at least partially transparent, such that light from a local area surrounding the headset 200 may be combined with light from one or more display blocks to produce Augmented Reality (AR) and/or Mixed Reality (MR) content.

In some embodiments, the headset 200 does not generate image light, and each lens 210 transmits light from the local area to the eye box. For example, one or both of the lenses 210 may be a lens without correction (non-prescription) or a prescription lens (e.g., single vision, bifocal and trifocal, or progressive) to help correct for defects in a user's eyesight. In some embodiments, each lens 210 may be polarized and/or tinted to protect the user's eyes from the sun. In some embodiments, each lens 210 may have a light blocking feature being activated, e.g., each lens 210 may be implemented as an electrochromic lens. In some embodiments, the lens 210 may include an additional optics block (not shown in FIG. 2). The optics block may include one or more optical elements (e.g., lens, Fresnel lens, etc.) that direct light to the eye box. The optics block may, e.g., correct for aberrations in some or all of visual content presented to the user, magnify some or all of the visual content, or some combination thereof.

In some embodiments, the lens 210 operates as a varifocal optical element that change its focal distance based on a user's eye gaze, e.g., as a focus-tunable lens. The lens 210 may be implemented as a liquid lens, liquid crystal lens, or some other type of lens that is able to vary its optical power. The lens 210 may be directly coupled to the controller 260, and the controller 260 may provide appropriate varifocal instructions (e.g., pulses with various voltage levels) to at least one portion of the lens 210 in order to change at least one optical power associated with the at least one portion of the lens 210.

In the example of FIG. 2, the headset 200 includes two eye tracking sensors 215 embedded into the frame 205, however the headset 200 can include a different number of eye tracking sensors 215 (e.g., two eye tracking sensors 215 per eye to provide stereo views of the eyes for 3D reconstruction of the pupil location). While FIG. 2 illustrates the eye tracking sensors 215 in example locations on the headset 200, the eye tracking sensors 215 may be located elsewhere on the headset 200. Similarly, there may be more or fewer sensors embedded into the frame 205 than what is shown in FIG. 2. For example, the headset 200 may include additional sensors, such as an event sensor, a position sensor, an acoustic sensor, a brain activity sensor, an environmental sensor, a temperature sensor, an impedance sensor, a breath sensor, an activity tracking sensor, or some combination thereof.

An eye tracking sensor 215 captures eye tracking data indicating eye tracking features of a user's eye (or multiple eyes). For example, an eye tracking sensor 215 captures the position and movements of a user's eye. In some embodiments, an eye tracking sensor 215 is a camera (e.g., IR or color camera) positioned to capture images of the user's eye (e.g., at sufficient frame rate and resolution to detect eye tracking features of interest (e.g., the location of the pupil over time)). The field of view of an eye tracking sensor 215 may be such that the captured images span the entirety of the eye of the user. For example, the captured image(s) of an eye span at least the distance between the inner canthus and outer canthus of the user and have the pupil visible in the FOV for all positions of the eye (when open).

In some embodiments, an eye tracking sensor camera includes one or more light emitters and a detector (e.g., photodiode or differential camera). A light emitter may emit tracking light (e.g., IR light) to the eye of the user, and the detector detects a signal related to a version of the tracking light reflected from at least one surface (e.g., pupil, retina, sclera, retina etc.) of the eye. The tracking light may be continuous, pulsed, structured light, some other type of light, or combination thereof. By detecting the signal related to the version of tracking light reflected from the at least one surface of the eye, the detector can capture various eye-related information for the user (also referred to as eye tracking data). In some embodiments, an eye tracking sensor camera includes a plurality of light emitters (e.g., an on-axis light emitter and a plurality of off-axis light emitters) and a differential camera. The on-axis light emitter is aligned to the differential camera, and the off-axis light emitters are off-axis relative to differential camera. In some embodiments, one or more eye tracking sensors 215 include laser-scanning MEMS sensors paired with photodiodes.

The headset 200 may include additional sensors to record data indicative of a user's activity. For example, the headset 200 includes an inertial measurement unit (IMU) sensor to determine motion of the user, a heart rate sensor (which may be useful for determining the activity level of the user), a gesture sensor configured to detect hand gestures of a user, or some combination thereof.

The controller 260 may be an example of controller 135 in FIG. 1. The controller 260 may be embedded into the frame 205 and coupled (e.g., interfaced) with the eye tracking sensors 215 embedded into the frame 205 and the transceiver 265. An example controller 260 is further described with respect to FIG. 3.

The transceiver 265 may communicate data (e.g., captured by the eye tracking sensors 215) to a server (e.g., server platform 615) communicatively coupled to the headset 200.

The headset 200 described herein may be used for other applications uses in addition to those described above. Applications of the headset 200 can be in digital health, multisensory augmentation, augmented reality, virtual reality, mixed reality, fall detection, human-computer interaction, drowsiness detection (e.g., during driving), monitoring progression of neurological diseases, alerts/reminders (e.g., for prescriptions), cognitive load monitoring, stroke detection, some other application, or combination thereof.

Figure 3:
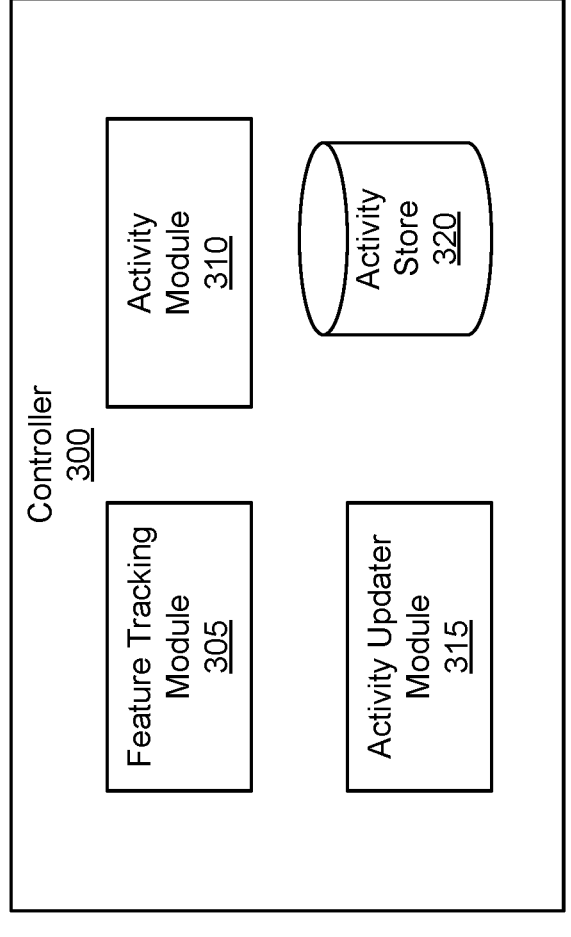
FIG. 3 is a controller that may be integrated into the headset of FIG. 2, in accordance with one or more embodiments.

FIG. 3 is a block diagram of a controller 300 of an eye tracking system, in accordance with one or more embodiments. The controller 300 is configured to use eye tracking data to determine a user's activity. Among other advantages, the controller 300 may determine a user's activity without using data from an outward facing camera (however data from an outward facing camera may be used to index the user's gaze into the world around them). Controller 300 may be an example of the controller 135 and/or 260. In the example of FIG. 3, the controller 300 includes a feature tracking module 305, a activity module 310, an activity updater module 315, and an activity store 320.

The functionality described in conjunction with one or more of the components shown in FIG. 3 may be distributed among the components in a different manner than described. Furthermore, the components of the controller 300 are not required to be part of a single device. Said differently, the controller 300 may be distributed among physically separate systems. For example, while a headset may collect eye tracking data, the processing of that data may be performed in multiple places e.g., headset (e.g., headset 105), server (e.g., server platform 115), or some combination thereof. In another example, a module (e.g., the activity module 310) of the controller 300 is part of a server (e.g., the server platform 115) separate from the device housing the remaining components of the controller 300 (e.g., headset 200). In this example, data relevant to that module may be communicated via a network (e.g., the network 112).

The feature tracking module 305 receives and analyzes eye tracking data recorded by an eye tracking sensor (e.g., eye tracking sensor 215) of an eye tracking system to determine eye tracking feature values of a user's eye during a time period (e.g., a threshold time period). The feature tracking module 305 may determine feature values for multiple eye tracking features. An eye tracking feature is a characteristic of a user's eye (examples provided below). An eye tracking feature value describes a quantity or quality of an eye tracking feature at a point in time (e.g., the size of the pupil diameter in millimeters). Values of an eye tracking feature may indicate a activity of the user (e.g., when considered in combination with values of other eye tracking features during the same time period). The eye tracking feature values determined by the feature tracking module 305 may depend on the type of data recorded by the eye tracking sensor. Example eye tracking features include: saccades (e.g., saccade rate, saccade velocity, or saccade magnitude); fixations (e.g., fixation duration, fixation rate (e.g., fixations over a given threshold duration), or fixation location or frequency of fixation in a given gaze direction); gaze vector (e.g., calibrated or uncalibrated gaze vector, such as the 3D location of the gaze or point of regard or extent of gaze vector (e.g., widest distance of gaze cone)); pupillometry (e.g., pupil diameter, pupil diameter variations over a threshold period of time, or pupil position); blinks (e.g., blink frequency or blink duration); head or gaze orientation (e.g., relative gaze vector with respect to head orientation or vestibular ocular reflex (e.g., gaze vector fixed to a single gaze point in space while head moves)); sensor movement (e.g., uncalibrated movements of sensor with respect to eye location, frame movements on head, or motion (from walking, speaking, eating, etc.); eyelids (e.g., squinting or winking); vergence distance (e.g., gaze distance as computed from the convergence angle of the eyes); some other characteristic of a user's eye; or some combination thereof.

Of the example eye tracking features listed above, vergence distance may be particularly useful in determining activities of users since many activities are associated with specific vergence distances (vergence distance indicates the distance of an object that a user is looking at). For example, for many users, the majority of their day is spent looking at a different displays, such as a phone, computer monitor, and TV. Since the viewing distances for each of these displays is usually constant and different for each display, vergence distance can be a good indicator for the type of display a user is looking at. Furthermore, if vergence distance is analyzed in combination with pupillometry data (pupils typically constrict when exposed to bright displays), the ability to determine (1) whether a user is looking at a display and (2) the type of display is increased (e.g., more robust or accurate). In another example, pupillometry data (e.g., pupil diameter) may be useful in determining whether the user is performing an activity outdoors or indoors (e.g., since it is typically brighter outdoors, a user's pupil is typically smaller compared to when they are indoors). In another example, dynamic or physically activities (e.g., sports) have more frequent and larger eye movements compared to other activities.

Although the feature tracking module 305 can determine values for any of the eye tracking features mentioned above, a method for determining a gaze distance of a user is provided below as an example. To determine the gaze distance, the feature tracking module 305 may analyze images of the user's eye (e.g., captured by an eye tracking sensor 215) to determine the horizontal gaze angle (since the horizontal gaze angle may be more useful for estimating gaze distance than the vertical gaze angle). As such, feature tracking module 305 may map a horizontal axis on the captured images of each eye. A horizontal axis may be bounded by two end points. The end points, for a given image of an eye, may correspond with locations of the inner canthus and outer canthus of the eye, or arbitrarily chosen points in the image frame. For example, the feature tracking module 305 may identify the locations of the inner canthus and outer canthus for each eye and define the horizontal axis of the left eye to be between the inner and outer canthus of the left eye, and the horizontal axis of the right eye to be between the inner and outer canthus of the right eye. In some embodiments, the feature tracking module 305 may not use end points at all, and instead parameterize the horizontal line segment by its length, angle, and origin.

To determine a gaze distance, the feature tracking module 305 may also identify a location of the pupil in captured images. To do this, the feature tracking module 305 may use an algorithm for detecting pupils in the captured images (e.g., a machine learned algorithm, an object recognition algorithm, an ellipse fitting algorithm, or some combination thereof). The feature tracking module 305 identifies a reference location (e.g., center of the pupil) on the pupil, and determines a distance of the reference location relative to the horizontal axis. The feature tracking module 305 can determine, for a position of the pupil in the captured image, where the reference point of the pupil maps to along the horizontal axis. The feature tracking module 305 may apply a model to the determined pupil locations on the determined horizontal axis to determine the gaze distance.

The activity module 310 determines a (e.g., visual) activity of the user (e.g., during a time period) based on the determined eye tracking feature values from the feature tracking module 305. Examples of detectable activities include mobile smartphone usage (e.g., even distinguishing between social media mobile application usage and other mobile application usage), reading (e.g., distinguishing between using a phone, physical book, or computer), watching videos (e.g., distinguishing between using a phone, TV, or theatre), conversation, presentations, meetings, transportation (e.g., distinguishing between walking, driving, or biking), sports, daydreaming, gaming, and content generation (e.g., distinguishing between typing, drawing, or coding).

Determining a activity of the user may include identifying the specific activity performed by the user (e.g., reading a physical book). For example, the activity module 310 associates a specific activity label with a time period. In some embodiments, determining a activity of the user during a time period doesn't include determining the specific activity performed. Said differently, the activity module 310 may determine that an activity was performed during a time period but it doesn't determine which activity was performed. For example, the activity module 310 determines an unspecified activity was performed during a time period by determining that activity transitions (also referred to as "context shifts") occurred before or after the time period.

To determine a specific activity of the user, the activity module 310 may identify eye tracking feature values that correspond to an activity (e.g., the eye tracking feature values follow specific patterns or sequences). For example, if a user's gaze movements are predominantly up-down motions and the gaze distance of the user's eyes indicates that the user is looking at an object less than a foot away, the activity module 310 may determine that the user is viewing a social media mobile application on their smartphone (the up-down motions may correspond to their eyes tracking the content scrolling vertically in the display). In another example, if a user's gaze movements are predominantly side-to-side horizontal movements with small (e.g., periodic) vertical movements and the gaze distance of the user's eyes indicates that the user is looking at an object between one and two feet from their eyes, the activity module 310 may determine that the user is reading text on a computer monitor (the side-to-side movements may correspond to their eyes reading text across the monitor display and the small vertical movements may correspond to new lines of text).

In another example, users typically perform identifiable eye behaviors while driving a vehicle. Specifically, when looking through a vehicle's front windshield, a user's vergence distance is typically far (e.g., 5-100 feet away) and their eye typically makes relatively small saccades (e.g., 2-8° amplitude). When looking through the rear-view mirror, a user typically has periodic saccades up and to the right (when the rear-view mirror is on the user's right side). When looking at the side mirrors, a user typically makes large horizontal saccades (e.g., greater than 10° amplitude) to the left or right depending on which side mirror.

In another example, while walking, a user typically fixates on points (e.g., objects) in the environment and successively moves from one fixated gaze point to another as they scan the environment. During each fixation, the act of walking naturally causes the user's head to bob up and down while the vestibulo-ocular reflex (VOR) keeps their gaze locked to a point in 3D space. This leads to a characteristic eye tracking signal in which the system can detect the presence of vertical VOR-like movements in a regular cadence, which may then be classified as the "walking" signal.

In another example, reading also has characteristic eye behavior which the activity module 310 may recognize. This reading behavior include a series of small saccades (corresponding to the user reading words in a line of text) followed by a large saccade (corresponding to when the user reaches to the end of a line of text and gazes at the next line).

In another example, watching TV (e.g., videos) also has characteristic eye and head motion behavior which the activity module 310 may recognize. This behavior includes a combination of a fixed vergence distance (to the display) along with limited field of view (observing a screen) and a largely stable head (detected by IMU or VOR signal), but otherwise has fixations, saccades, and smooth pursuits that may mimic viewing the natural world.

Since eye tracking feature values can indicate an activity, changes in eye tracking feature values can indicate changes in activities. Thus, in addition to, or alternative to, identifying specific activities performed by the user, the activity module 310 may determine activity transitions by identifying changes (e.g., statistically significant changes) in eye tracking feature values. Continuing from the previous examples, if a user transitions from viewing social media content on their smartphone to reading text on a computer monitor, the activity module 310 may determine that an activity transition occurred by identifying that (1) the user's gaze movements transitioned from predominantly up-down motions to side-to-side horizontal movements with small (e.g., periodic) vertical movements, (2) the convergence angle of the user's eyes changed, or (3) some combination thereof. Determining that the changes in (1) occur within a threshold time period of the changes in (2) may also contribute to the activity module 310 determining an activity transition occurred.

Since some eye tracking feature values are rarely constant, even if the user is performing a single activity, it may be advantageous when determining a activity of a user, to determine statistical values of one or more eye tracking features over time instead of individual eye tracking feature values. For example, while the activity of a user may not be apparent from a single eye tracking feature value, the statistics of an eye tracking feature over time may indicate the activity of the user. For example, the average rate of saccades over time may be more valuable than detecting a single saccade. Users' eyes saccades very often for many different activities. Thus, detecting a single saccade may not be helpful to determine the user's activity.

In some embodiments, a user's activity can be determined by identifying sub-activities performed during the activity. An example activity including sub-activities is a user taking notes during a lecture or presentation. This activity includes two sub-activities being performed together: (1) looking at the presenter or a whiteboard and (2) writing. Both of these sub-activities may be determined by the activity module 310. Additionally, the activity module 130 can consider these activities in combination (e.g., recognizing that the user is periodically transitioning between these two activities) and thus determine the user is actually taking notes during a lecture. More generally, to determine a user's activity based on sub-activities, the activity module 310 may identify activities as being performed together (e.g., the user is transitioning between activities), determine the periodicity of activities being performed together, determine the duration of each activity, determine the standard deviation of the duration of each activity, or some combination thereof.

Furthermore, some activities correspond to similar eye tracking feature values. For example, two different activities may have similar gaze movements. Thus, it may be advantageous to analyze multiple eye tracking features in combination to determine an activity of the user (since activities are less likely to share the same combination of eye tracking feature values). For example, the activity module may (1) determine eye tracking feature vectors that represent multiple eye tracking feature values for points in time and (2) analyze the distributions of these vectors over time (since different activities may demonstrate different distributions). In this example, similar vectors may be grouped together and different groups may indicate a different activities. Note that a feature vector is a vector representing eye tracking feature values for a point in time (e.g., $V(t_0)$=[value of feature 1 at to, value of feature 2 at $t_0$, . . . , value of feature N at $t_0$]).

As suggested above, to determine a user's behavior over time, the activity module 310 may perform clustering techniques to form groups of eye tracking feature values that correspond to the same (or similar) activities. Example clustering techniques include k-means clustering, support vector machines, affinity propagation, agglomerative clustering, BIRCH, DBSCAN, mean shift, OPTICS, spectral clustering, or mixture of gaussians.

The activity module 310 may perform supervised or unsupervised clustering techniques. For the unsupervised techniques, eye tracking feature values may be automatically classified into distinct groups without prior knowledge of the activity being performed. In some embodiments, the eye tracking features may be classified into distinct groups without examples of what the eye tracking features corresponds to for different activities. The technique may further include grouping eye tracking features over time into groups of similar features, representing each group as distinct from preceding or following activities. Said differently, for unsupervised techniques, the activity module 310 detects the transition from one activity to a different activity.

For supervised activity detection techniques, the activity module 310, has prior knowledge of which eye tracking feature value combinations correspond to which activities. For example, the activity module 310 includes a machine learned clustering model that was trained using labeled eye tracking data indicating which activities were performed. For example, the labeled eye tracking data was used to improve the clustering weights of the clustering model. Thus, more generally, the activity module 310 can include a machine learned model (e.g., trained from labeled eye tracking data) to classify eye tracking feature values into the activity that was performed e.g., reading, mobile phone use, social media use, etc. In some embodiments, a machine learned model of the activity module 310 is a recurrent neural network (e.g., using a long short-term memory neural network or gated recurrent units) that considers the time-based component of the eye tracking feature values. This may be useful in determining activities that include combinations of sub-activities.

In some embodiments, labeled training data is generated by a user self-reporting their activities. For example, after the activity module 310 identifies blocks of time during which the user performed activities (e.g., by identifying activity transitions), the user may indicate which activity they performed during each block of time. This newly generated labeled data may be used to train (or retrain) the activity module 310. In some embodiments, the newly generated labeled data is used to train (or retrain) an activity module 310 specifically associated with the user, thus making the activity module 310 better at determining activities of the user.

The activity updater module 315 receives determinations from the activity module 310 and updates the activity history of the user. For example, the activity updater module 315 receives times when activity transitions occurred and updates the activity store 320 with these activity transitions. Additionally, or alternatively, the activity updater module 315 receives activities identified by the activity module 310 and updates the activity store 320. The activity store 320 may also be updated with time periods associated with the identified activities (e.g., start and end times of each activity or time duration of each activity.

The activity store 320 is a database (or distributed database) that stores the activity history of a user. The activity history describes activities of the user. For example, the activity history includes activities or activity transitions of the user. The activity history may also include time period information associated with activities or activity transitions. Data in the activity history (or analyses based on data in the activity history) may be presented to the user. Examples of this are described with respect to FIGS. 7A-8B.

Figure 4:
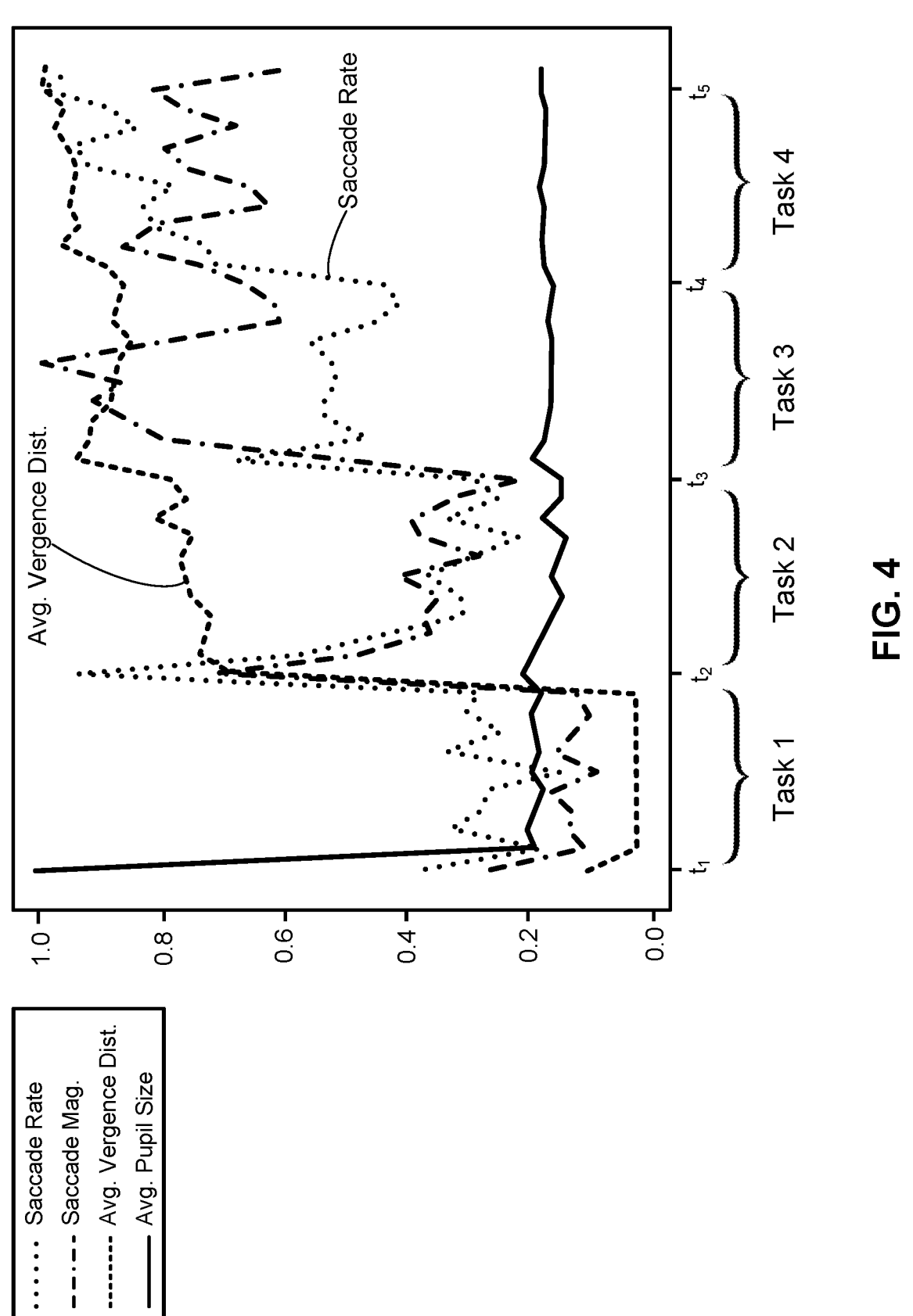
FIG. 4 is a plot of eye tracking data of a user over time, in accordance with one or more embodiments.

FIG. 4 is a plot of eye tracking data of a user over time, in accordance with one or more embodiments. Specifically, FIG. 4 is a plot of the behavior of four example eye tracking features of the user (saccade rate, saccade magnitude, average vergence distance, average pupil size) across four different activities (referred to as tasks). The values of the four eye tracking features are calculated as moving averages over time (e.g., saccade rate is the average saccade rate over the last few saccades). The x-axis plots time (e.g., in increments of five minutes) and the y-axis plots normalized values of the eye tracking features. In this example, task 1 is the user observing an outdoor landscape, task 2 is the user observing a landscape photograph, task 3 is the user playing a memory matching game, and task 4 is the user playing a sudoku puzzle. The user was outdoors to perform task 1, and the user looked at a computer display to perform tasks 2-4. Differentiating these four activities is interesting because they are similar to each other and common activities for users. For example, observing an outdoor landscape (task 1) is similar to observing a landscape photograph (task 2), and playing a memory matching game on a display (task 3) is similar to playing a sudoku puzzle on the display (task 4).

The four eye tracking features in FIG. 4 (saccade rate, saccade magnitude, average vergence distance, and average pupil size) were tracked because they represent many of the movements a user's eye makes. Saccade rate and magnitude indicate how often the user is looking around and how far apart the user's gaze objects are. As previously described, vergence distance is an indicator of the type of activity since various activities tend to have specific distances that they are performed at. Pupil diameter tends to depend on the environment brightness (e.g., bright vs dark environments) but also with other things, like cognitive load.

The values of these features can be analyzed to determine the activities of the user. For example, average vergence distance jumps between task 1 (outdoor observation) and task 2 (landscape photograph observation) and continues to stay high for tasks 3-4. This may be due to tasks 2-4 being computer-based tasks that have a closer vergence distance). Additionally, the saccade rate increases from task 3 (memory game) to task 4 (sudoku puzzle). Note that vergence distance has an upward trend for tasks 2-4. This may indicate the user got closer to the display over time (a user's distance to a display may indicate how engaged they were in the activity).

As previously described, instead of visually analyzing plots of eye tracking data to identify trends associated with activities, one or more models can be applied to eye tracking feature values to determine activities. Generally, models that can separate high-dimensional data may work well. Models that can support temporally changing signals may have an advantage in determining the user's activities. In some embodiments, a machine learned clustering model can be used for automatic (unsupervised) clustering of feature vectors into different groups of activities (e.g., tasks). As previously described, a feature vector is a vector representing eye tracking feature values for a point in time (e.g., components of the vector correspond to eye tracking feature values).

Figure 5:
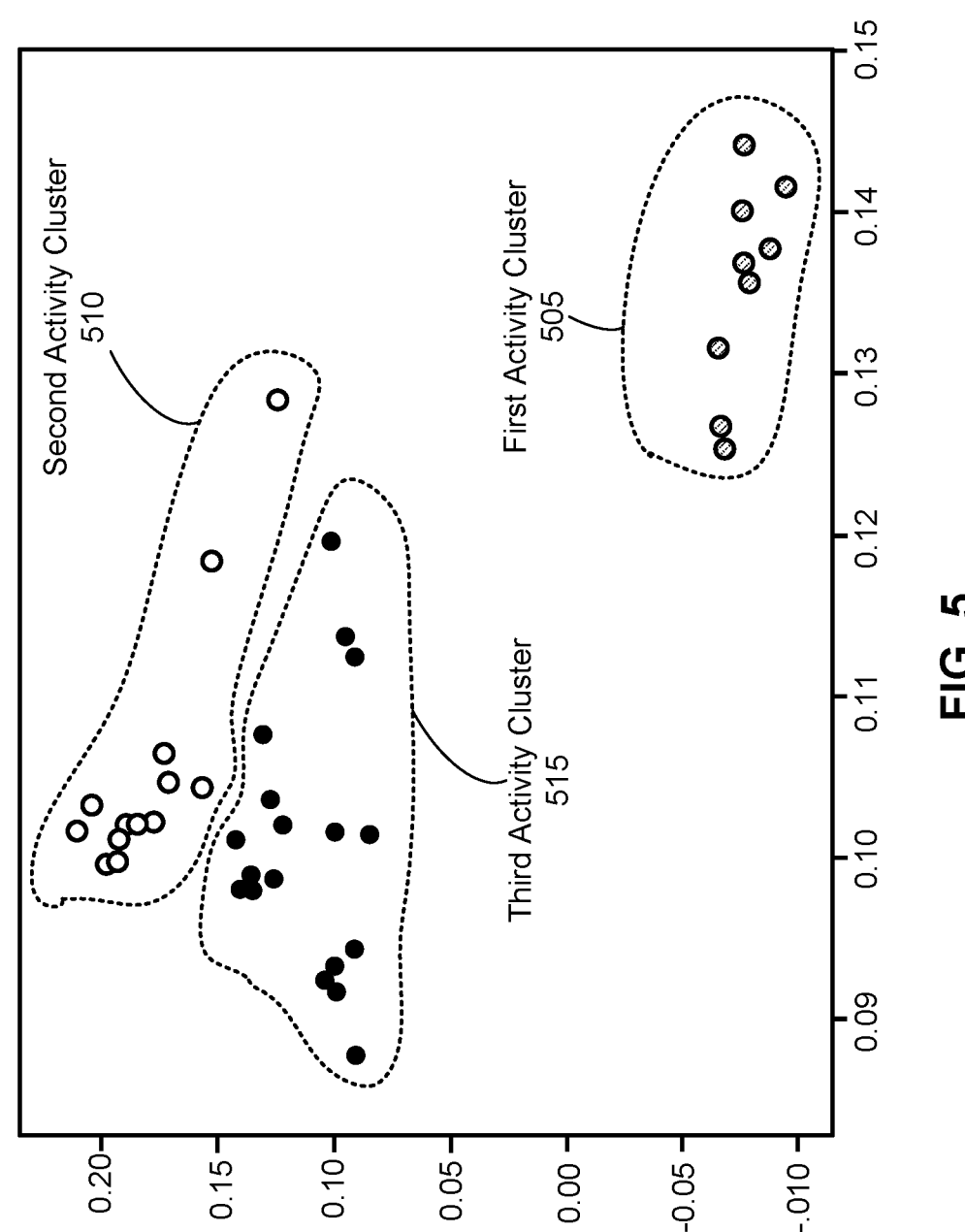
FIG. 5 is a k-means cluster plot of eye tracking feature vectors, in accordance with one or more embodiments.

FIG. 5 is a k-means cluster plot of eye tracking feature vectors, in accordance with one or more embodiments (the x and y axes represent different principal components. The eye tracking feature vectors were generated (e.g., by the activity module 310) based on the eye tracking feature values illustrated in FIG. 4. Specifically, each point is a projection of a 4-component feature vector at a given point in time (four components because there are four different eye tracking features illustrated in FIG. 4 (e.g., the first vector component of a vector is a value of the saccade rate, the second vector component is a value of the saccade magnitude, etc.)). However, in other embodiments, the vectors may have more or less components. The fill of the points (white, black, and striped) was assigned to group similar feature vectors together to represent individual activities. For clarity, the first cluster 505 (striped points), second cluster 510 (white points), and third cluster 515 (black points) are labeled. Although the second and third clusters are close together, the clustering technique was able to differentiate the two clusters. Furthermore, note that FIG. 5 illustrates the principal component analysis of the higher-dimensional data. The second and third clusters may be separated more obviously in another dimension that isn't apparent in FIG. 5. Overall, the different clusters demonstrate that some of the activities have distinct statistics over other activities. However, since the user performed four different tasks, at least two of the tasks do not have feature tracking statistics different enough to distinguish them apart according to this clustering technique.

Figure 6:
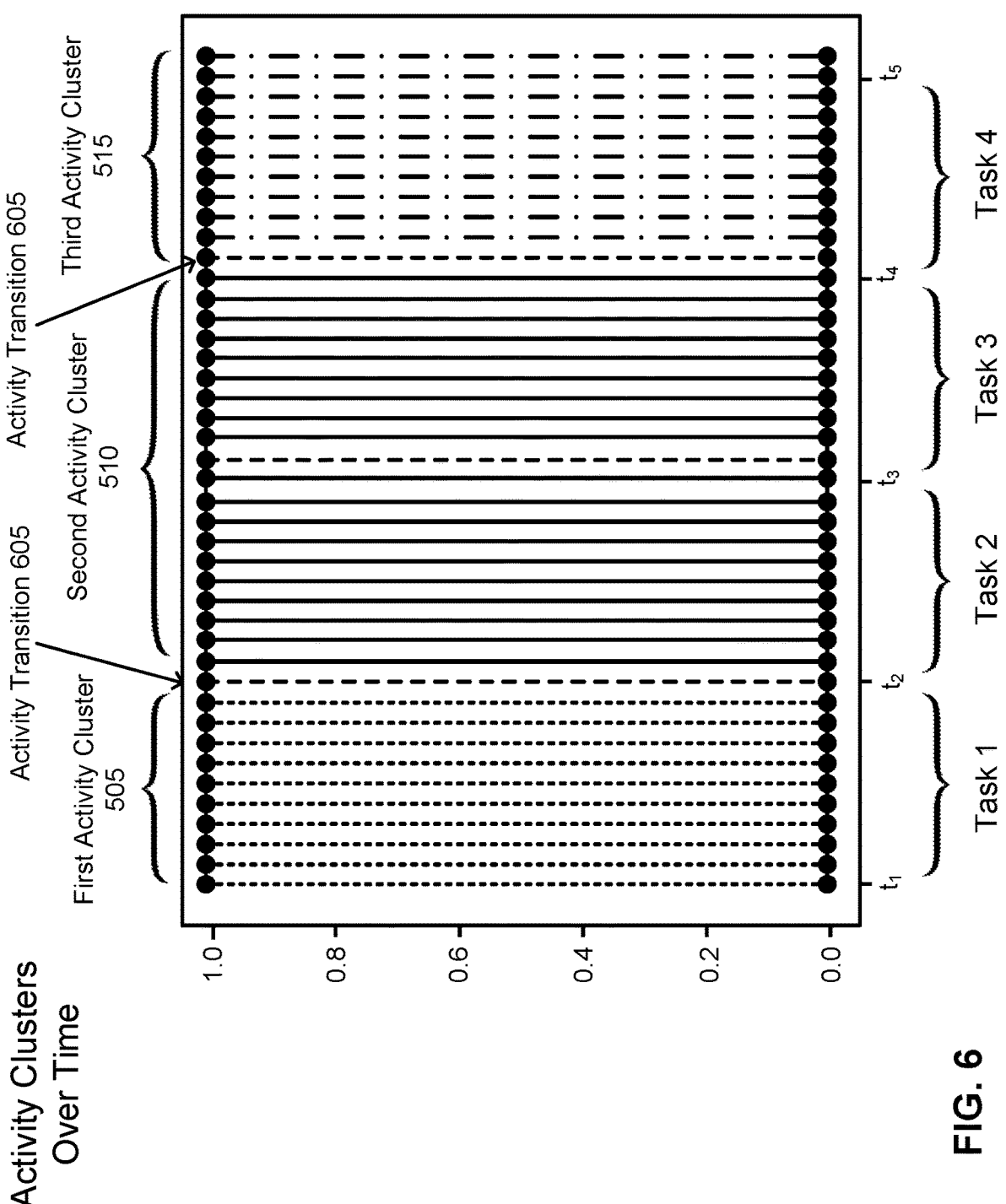
FIG. 6 is a plot of eye tracking feature vectors over time, in accordance with one or more embodiments.

FIG. 6 is a plot of the feature vectors over time, in accordance with one or more embodiments. The x-axis represents time and each feature vector has a normalized value of one on the y-axis. The vectors are also labeled according to their assigned cluster from FIG. 5. As illustrated, vectors of the first activity cluster 505 correspond to task 1, vectors of the second activity cluster 510 correspond to tasks 2-3, and vectors of the third activity cluster 515 correspond to task 4. Thus, FIG. 6 illustrates that the classified clusters from FIG. 5 match up in time to three different activities, with transitions 605 occurring between tasks. Thus, clustering techniques can be used to determine different activities of a user. However, in this example, task 2 and task 3 were clustered together. This occurred because the eye feature values of those tasks were not sufficiently distinct to be separated by the k-means clustering process. However, this does not mean tasks 2 and 3 are undistinguishable using eye tracking data. For example, other clustering techniques may be used (e.g., a clustering model trained using labeled training data) or additional eye tracking features may be used to differentiate these tasks (and other tasks).

As indicated above, distinct activities may be identified based on feature vector clustering. These clusters indicate activity transitions from one activity to another activity e.g., from reading a book to using their smartphone. However, determining activity transitions via cluster analysis can be determined even if the specific activities being performed are not known. Said differently, detecting and determining activity transitions does not require prior knowledge of activity data or supervised classification. In some embodiments, activity transitions are detected in real-time as eye tracking features are recorded without performing a full clustering or classification of the data. For example, a activity model 310 may be implemented that uses a few broad pre-learned clusters, and a transition would be detected in between those. Additionally, or alternatively, a threshold distance in feature space is set and if it changes by enough, the activity module 310 is instructed to identify it as a context shift.

Activity detection (e.g., by the activity module 310) may be used to present useful insights (e.g., feedback) to a user. For example, a context shift can represent a relative loss in focus as the user's attention has moved from one activity to another. In light of this, a user focus or attention score ("focus score") may be determined to summarize a user's focus or attentive behavior during a period of time (e.g., a day). A focus score may be computed as a function of the occurrence of context shifts over time (e.g., the number of context shifts, frequency of context shifts, or duration of time between context shifts). Additionally, or alternatively, the focus score may be based on the activities detected. For example, specific combinations of activities may indicate high or low levels of user focus. In another example, the duration of a detected activity may indicate high or low levels of user focus.

FIG. 7A illustrates a chart 705 of a user's activities throughout a day and a chart 720 of the user's focus score throughout the day, in accordance with one or more embodiments. Chart 705 is a block diagram that indicates different activities the user performed throughout the day (e.g., determined based on combinations of eye tracking feature values). Each activity is indicated by a different block fill pattern. Chart 705 also includes context shifts 710 that indicate when the user transitioned from one activity to another. In the example of FIG. 7A, the activities performed by the user are listed in legend 715, however this is not required. As previously described, time periods when activities were performed may be detected without determining which activities were performed during those time periods. Chart 720 is a plot of the user's focus score through the day. The plot also includes "flow sessions" that indicate time periods of high focus. A flow session constitutes a block of time where a single activity was performed for a threshold duration of time (e.g., 15 minutes), without distraction (e.g., defined as a transition or a number of transitions to a different activity).

The data displayed in FIG. 7A may be determined by the activity module 310 based on eye tracking data (e.g., captured by headset 200). Additionally, the data displayed in FIG. 7A may be displayed to the user to provide insights through a smartphone, web browser, computer application, or other means of digital display. For example, see FIG. 7B.

FIG. 7B illustrates a smartphone displaying activity insights, in accordance with one or more embodiments. The display includes chart 720 from FIG. 7A. The display also includes additional focus insights about the user's day. The "/3" flow sessions and "/4" hours focused time indicate different focus goals set by a user or automatically determined.

Overall, the charts in FIG. 7A and the additional insights in FIG. 7B indicate the user was generally focused throughout the day. For example, chart 7A includes three long flow sessions and the focus score is generally high. Additionally, the activity blocks are relatively long.

Figures 8A, 8B:
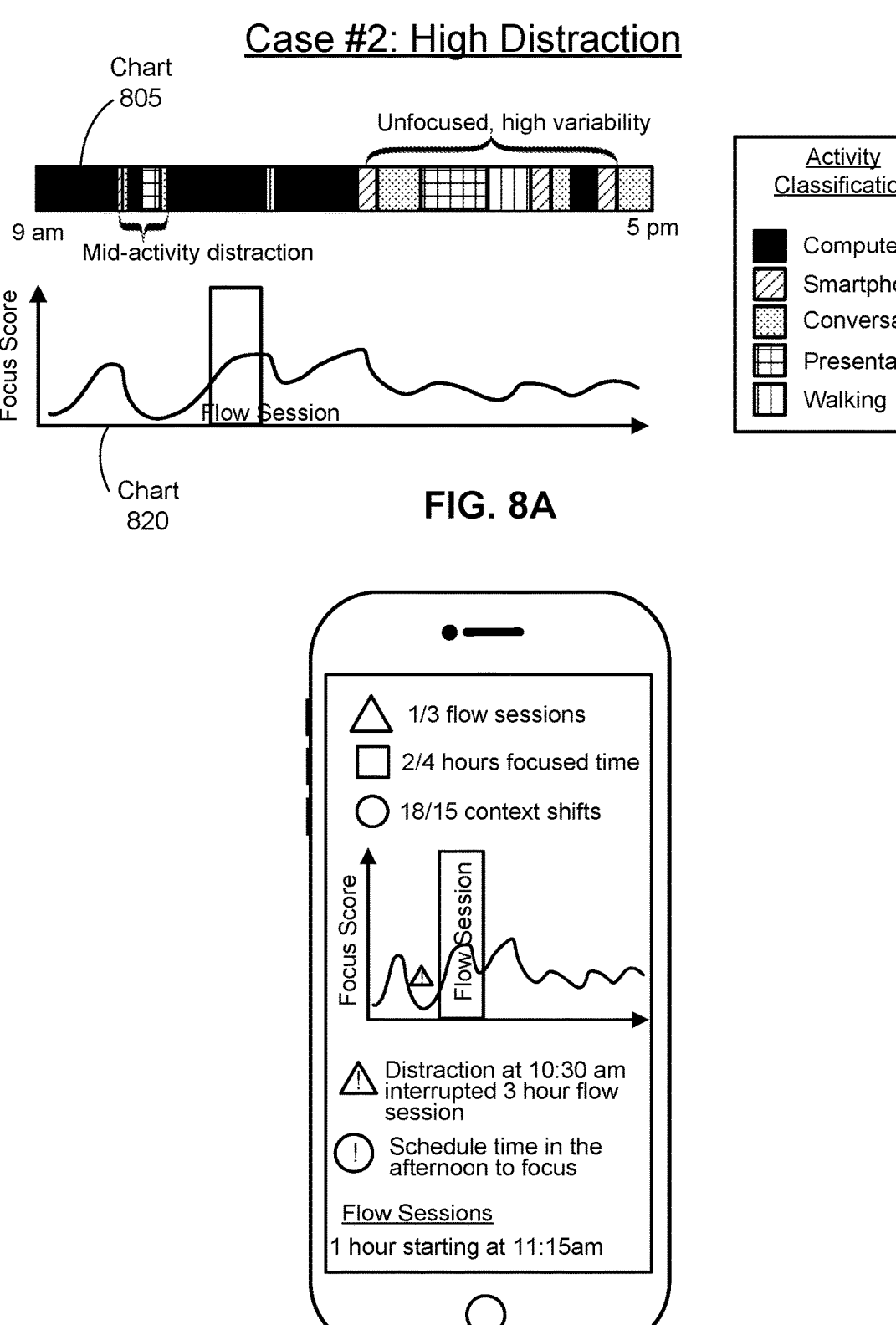
FIG. 8A includes the same charts as FIG. 7A displaying different data, in accordance with one or more embodiments.
FIG. 8B illustrates a smartphone displaying activity insights corresponding to the data displayed in FIG. 8A, in accordance with one or more embodiments.

FIG. 8A includes the same charts as FIG. 7A, however, the charts display different data, in accordance with one or more embodiments. For example, chart 805 include activities in different orders and chart 820 illustrates different focus scores throughout the day.

FIG. 8B illustrates a smartphone displaying activity insights corresponding to the data displayed in FIG. 8A, in accordance with one or more embodiments. Overall, the charts in FIG. 8A and the additional insights in FIG. 8B indicate the user was generally not focused throughout the day (said differently, the user was distracted throughout the day). For example, chart 820 only includes one short flow session, and the focus score is generally low. Additionally, the activity blocks are relatively short and some include many interruptions.

In some embodiments, activity blocks are shown to users (e.g., as illustrated in chart 705) as full-resolution data showing all classified activities. Alternatively, activity blocks can be filtered to show just relevant activities or only activity blocks of a threshold duration or with a relationship to other activity blocks. In some embodiments, activity blocks may be displayed in a calendar application. This may help the user track their activities (and activity durations) over multiple days, weeks, months, etc. The activity blocks can even be combined with other calendar events in the user's calendar to help the user understand how calendar events affect their focus. A user's past calendar events and activity blocks may be analyzed to provide suggestions about future times that may be optimal for a given user's historical focus scores. For example, an application may suggest times in the future that would be best reserved to repeat focused behavior based on past activity block measurements that show more focused time.

In some embodiments, a focus score, activity block classification, or context shift detection are performed in real-time to perform automatic functions to help the user focus on an activity. For example, if an analysis (e.g., by the activity module 310) determines a user is focused, this may trigger the "Do Not Disturb" setting on the user's smartphone or computer in order to block possibly distracting notifications until the user stops focusing (e.g., indicated by a context shift detection). Afterwards, blocked notifications may be by displayed now that the user is no longer focused.

Additionally, or alternatively, focus score tracking may be useful for medical uses, such as tracking cognitive decline in older users or for users with ADHD (Attention-deficit/hyperactivity disorder).

The methods and applications described herein may be extended to research-based features in which users without headsets (or other means of providing eye tracking data) may be given generalized insights based on a stream of their data (e.g., calendar events) combined with representative data from a different group of users who have collected both that data and eye tracking data for the purposes of activity block classification and focus score estimation.

Figure 9:
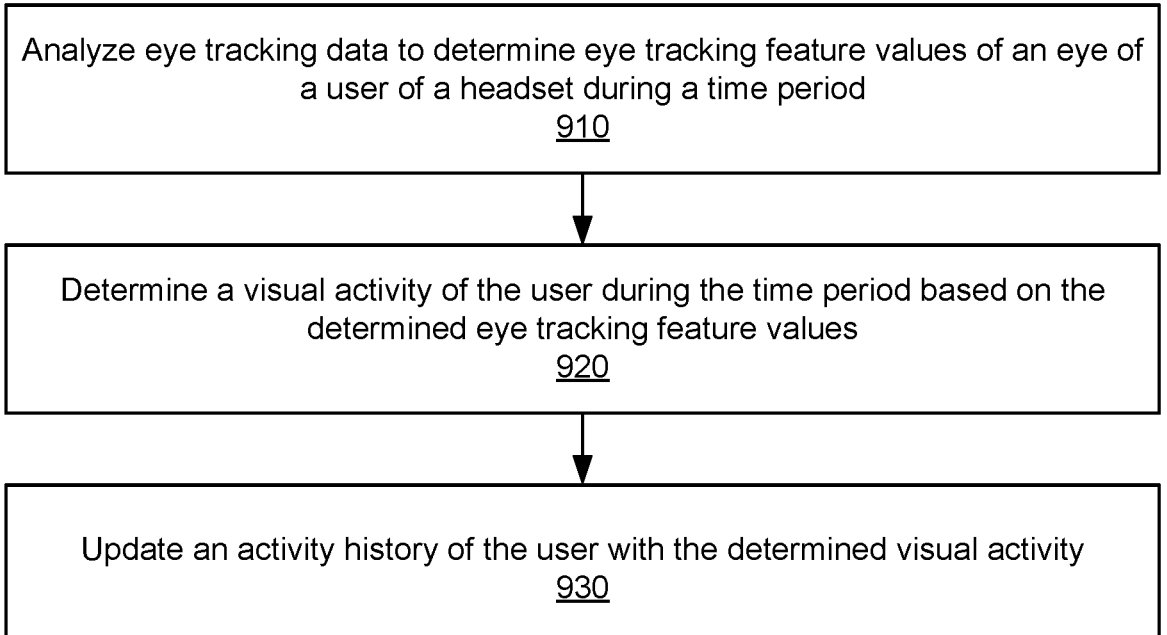
FIG. 9 is a flow chart illustrating a process for determining a activity of a user, in accordance with one or more embodiments.

FIG. 9 is a flow chart illustrating a process 900 for determining a (e.g., visual) activity of a user, in accordance with one or more embodiments. In the example of FIG. 9, steps of the process 900 are performed by a controller (e.g., controller 300) of an eye tracking system, however other entities (e.g., components of platform 100) may perform some or all of the steps of the process 900 in other embodiments. Likewise, embodiments may include different and/or additional steps, or perform the steps in different orders. In some embodiments, the steps of process 900 are stored on a non-transitory computer-readable medium and are configured to be executed by a computer device.

The controller analyzes 910 eye tracking data to determine eye tracking feature values of an eye of a user of the headset during a time period. The eye tracking data may be captured by sensors (e.g., an image capturing system). For example, the eye tracking data is captured via one or more sensors embedded into a frame of a headset. In some embodiments, the headset doesn't include an outward facing camera. An outward facing camera may face an external environment in front of the user.

The controller determines 920 an activity of the user during the time period based on the determined eye tracking feature values. To determine the activity, the controller may identify eye tracking feature values that correspond to the activity. In some embodiments, the feature values include movements of the eye, and determining the activity comprises identifying movements of the eye that correspond to the activity. The activity may be determined without referencing or using an outward facing camera image (e.g., an image captured by an outward facing camera (e.g., on a headset)). In some embodiments, the controller determines and tracks multiple activities performed by the user throughout a threshold period of time (e.g., a day, week, or month).

The controller updates 930 an activity history of the user with the determined activity.

The process 900 may further include the controller monitoring changes in the eye tracking feature values and determining that the user transitions from the activity to a second activity based on the monitored changes.

In some embodiments, determining the activity of the user (step 920) includes determining eye tracking feature vectors representing eye tracking feature values for points in time during the time period. The activity may be determined by analyzing a distribution of the eye tracking feature vectors over the time period. In some embodiments, determining the activity comprises: applying a vector clustering model to the eye tracking feature vectors to form activity clusters; and determining the activity based on activity clusters at points in time during the time period.

The process 900 may further include the controller receiving an activity designation from the user, where the activity designation is used to determine the activity of the user.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

analyzing eye tracking data to determine first eye tracking feature values for a first eye tracking feature of an eye of a user of a headset during a time period, the first eye tracking feature of the eye being a first characteristic of the eye, wherein the eye tracking data is determined from an eye tracking system on the headset;

analyzing the eye tracking data to determine second eye tracking feature values for a second eye tracking feature of the eye of the user of the headset during the time period, the second eye tracking feature of the eye being a second characteristic of the eye and being different than the first eye tracking feature;

determining an activity of the user during the time period based on the determined first eye tracking feature values and the determined second eye tracking feature values, wherein the activity of the user is determined without referencing an outward facing camera image, and wherein the determined activity of the user is not the first eye tracking feature values or the second eye tracking feature values;

updating an activity history of the user with the determined activity;

monitoring changes in the first eye tracking feature values and monitoring changes in the second eye tracking feature values; and determining that the user transitions from the activity to a second activity based on the monitored changes of the first eye tracking feature values and the second eye tracking feature values.

2. The method of claim 1, wherein determining the activity comprises identifying first eye tracking feature values and second eye tracking feature values that correspond to the activity.

3. The method of claim 2, wherein the first eye tracking feature values include movements of the eye, and determining the activity comprises identifying movements of the eye that correspond to the activity.

4. The method of claim 1, wherein determining the activity of the user comprises determining eye tracking feature vectors representing first eye tracking feature values and second eye tracking feature vectors for points in time during the time period, wherein at least one of the determined eye tracking feature vectors represents one of the first eye tracking feature values and one of the second eye tracking feature values for a point in time during the time period.

5. The method of claim 4, wherein the activity is determined by analyzing a distribution of the eye tracking feature vectors over the time period.

6. The method of claim 4, wherein determining the activity comprises:

applying a vector clustering model to the eye tracking feature vectors to form activity clusters; and determining the activity based on activity clusters at points in time during the time period.

7. The method of claim 1, wherein multiple activities performed by the user throughout a day are determined.

8. A non-transitory computer-readable storage medium comprising stored instructions, the instructions when executed by a computer device, causing the computer device to:

analyze eye tracking data to determine first eye tracking feature values for a first eye tracking feature of an eye of a user of a headset during a time period, the first eye tracking feature of the eye being a first characteristic of the eye, wherein the eye tracking data is determined from an eye tracking system on the headset;

analyzing the eye tracking data to determine second eye tracking feature values for a second eye tracking feature of the eye of the user of the headset during the time period, the second eye tracking feature of the eye being a second characteristic of the eye and being different than the first eye tracking feature;

determine an activity of the user during the time period based on the determined first eye tracking feature values and the determined second eye tracking feature values, wherein the activity of the user is determined without referencing an outward facing camera image, and wherein the determined activity of the user is not the first eye tracking feature values or the second eye tracking feature values;

update an activity history of the user with the determined activity;

monitoring changes in the first eye tracking feature values and monitoring changes in the second eye tracking feature values; and determining that the user transitions from the activity to a second activity based on the monitored changes of the first eye tracking feature values and the second eye tracking feature values.

9. The non-transitory computer-readable storage medium of claim 8, wherein to determine the activity, the non-transitory computer-readable storage medium further comprises instructions that cause the computer device to identify first feature values and second feature values that correspond to the activity.

10. The non-transitory computer-readable storage medium of claim 9, wherein:

the first feature values include movements of the eye; and to determine the activity, the non-transitory computer-readable storage medium further comprises instructions that cause the computer device to identify movements of the eye that correspond to the activity.

11. The non-transitory computer-readable storage medium of claim 8, wherein to determine the activity, the non-transitory computer-readable storage medium further comprises instructions that cause the computer device to determine eye tracking feature vectors representing first eye tracking feature values and second eye tracking feature vectors for points in time during the time period, wherein at least one of the determined eye tracking feature vectors represents one of the first eye tracking feature values and one of the second eye tracking feature values for a point in time during the time period.

12. The non-transitory computer-readable storage medium of claim 11, wherein to determine the activity, the non-transitory computer-readable storage medium further comprises instructions that cause the computer device to analyze a distribution of the eye tracking feature vectors over the time period.

13. The non-transitory computer-readable storage medium of claim 11, wherein to determine the activity, the non-transitory computer-readable storage medium further comprises instructions that cause the computer device to:

apply a vector clustering model to the eye tracking feature vectors to form activity clusters; and determine the activity based on activity clusters at points in time during the time period.

14. The non-transitory computer-readable storage medium of claim 8, wherein the non-transitory computer-readable storage medium comprises instructions that cause the computer device to determine and track multiple activities of the user throughout a day.

15. A headset comprising:

one or more sensors embedded into a frame of the headset and configured to capture eye tracking data indicating positions and movements of an eye of a user of the headset; and a controller configured to:

analyze eye tracking data from the one or more sensors to determine first eye tracking feature values for a first eye tracking feature of the eye during a time period, the first eye tracking feature of the eye being a first characteristic of the eye;

analyzing the eye tracking data to determine second eye tracking feature values for a second eye tracking feature of the eye of the user of the headset during the time period, the second eye tracking feature of the eye being a second characteristic of the eye and being different than the first eye tracking feature;

determine an activity of the user during the time period based on the determined first eye tracking feature values and the determined second eye tracking feature values, wherein the activity of the user is determined without referencing an outward facing camera image, and wherein the determined activity of the user is not the first eye tracking feature values or the second eye tracking feature values;

update an activity history of the user with the determined activity;

monitoring changes in the first eye tracking feature values and monitoring changes in the second eye tracking feature values; and determining that the user transitions from the activity to a second activity based on the monitored changes of the first eye tracking feature values and the second eye tracking feature values.

16. The headset of claim 15, wherein to determine the activity, the controller is further configured to identify first feature values and second eye tracking feature values that correspond to the activity.

* * * * *